B. C. BRADLEY.
Draft-Equalizer.
No. 199,142. Patented Jan. 15, 1878.
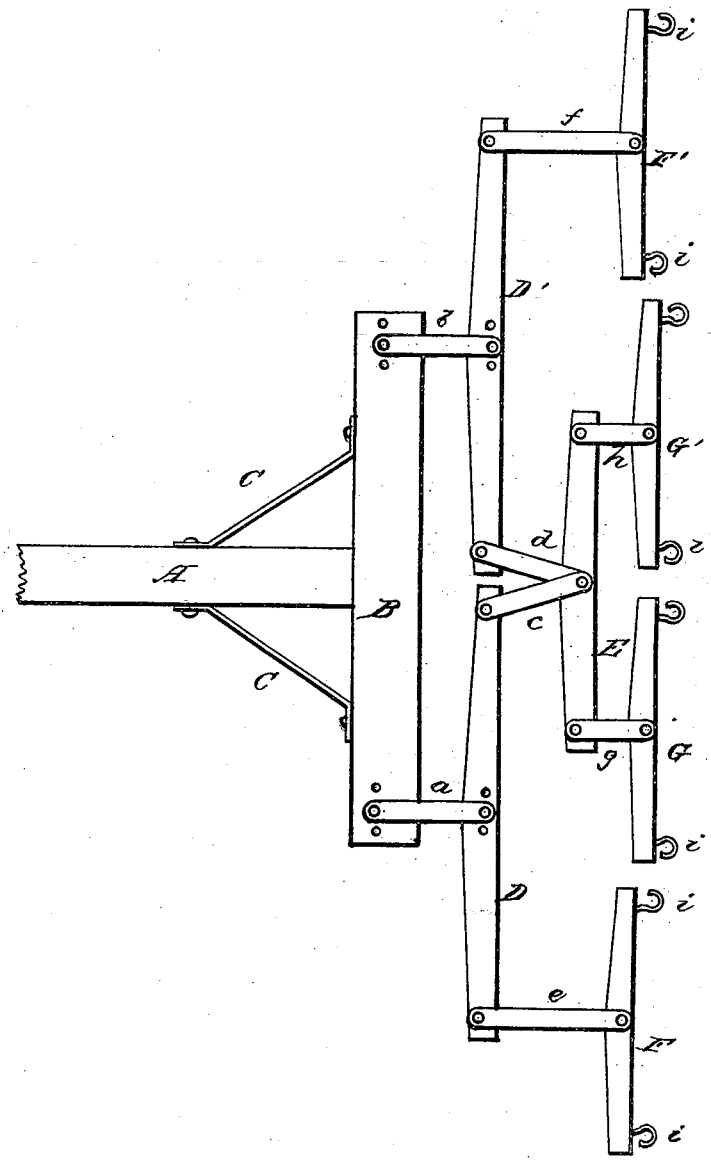
WITNESSES:
L L Bond
O W Bond
INVENTOR:
Byron C Bradley

UNITED STATES PATENT OFFICE.

BYRON C. BRADLEY, OF CHICAGO, ILLINOIS.

IMPROVEMENT IN DRAFT-EQUALIZERS.

Specification forming part of Letters Patent No. 199,142, dated January 15, 1878; application filed September 23, 1875.

*To all whom it may concern:*

Be it known that I, BYRON C. BRADLEY, of the city of Chicago, Cook county, State of Illinois, have invented a new and useful Improvement in Four-Horse Equalizers, of which the following is a full description, reference being had to the accompanying drawing, in which the figure is a top or plan view.

The nature of my invention consists in a novel arrangement of double-trees or pivoted draft-bars and whiffletrees, so as to equalize the draft of four horses abreast, as hereinafter described.

In the drawing, A represents the beam of a gang-plow or the tongue of a vehicle; B, a cross-bar permanently attached to the beam or tongue, and which may be supported by braces C when necessary; D D', equalizing-bars or double-trees attached to the cross-bar B by the links $a\,b$; E, a central evener or double-tree attached to the inner ends of the bars D D' by the links $c\,d$; F F', whiffletrees attached to the outer ends of the bars D D' by the links $e\,f$; G G', whiffletrees attached to the central draft-bar E by the links $g\,h$; $i$, whiffletree-hooks.

The links $e\,f$, as will be seen, are made long enough to bring the whiffletrees F F' on a line, or nearly on a line, with the whiffletrees G G'.

In construction, the parts A B are made sufficiently strong to stand the draft of four horses. The equalizing-bars D D' are pivoted centrally, as by this arrangement the two inner horses are made to draw against the two outer, and the draft is equalized through the links $a$ to $f$. The draft of the inner horses is equalized by attaching the links $c\,d$ to a single pivot on the bar E, and the attachment to each end of the bar E of the whiffletrees G G' by the links $g\,h$, as shown.

By this arrangement of the equalizing-bars, links, and whiffletrees the draft of four horses abreast will be equalized, and the draft brought equal without any side strain on the beam or tongue A. This arrangement also equalizes the draft between four horses, so that each one balances against the other three without requiring more service of one than of the other.

The cross-bar B and the equalizing-bars D D' may be provided with adjusting-holes for changing the position of the links $a\,b$ somewhat when horses of unequal strength are used.

The beam A may be attached to either end of the cross-bar B for right or left hand plows, so that the outer horse may walk in the furrow and the other three on the land.

What I claim as new, and desire to secure by Letters Patent, is as follows:

The combination of the rigid cross-bar B and equalizing-bars D, D', and E with the links $a\,b\,c\,d\,e\,f\,g\,h$ and whiffletrees F F' G G', substantially as and for the purposes specified.

BYRON C. BRADLEY.

Witnesses:
L. L. BOND,
O. W. BOND.